US007146171B2

(12) United States Patent  
Tang et al.

(10) Patent No.: US 7,146,171 B2  
(45) Date of Patent: Dec. 5, 2006

(54) METHOD AND APPARATUS PROVIDING ENHANCED RESERVATION ACCESS MODE FOR A CDMA REVERSE CHANNEL

(75) Inventors: Clive K. Tang, Irving, TX (US); Mohamed El-Rayes, Plano, TX (US); Roy Thomas Derryberry, Plano, TX (US); Giridhar Dhati Mandyam, Plano, TX (US)

(73) Assignee: Nokia Corporation, Espoo (FI)

( * ) Notice: Subject to any disclaimer, the term of this patent is extended or adjusted under 35 U.S.C. 154(b) by 120 days.

(21) Appl. No.: 10/448,860

(22) Filed: May 30, 2003

(65) Prior Publication Data

US 2004/0242231 A1 Dec. 2, 2004

(51) Int. Cl.  
*H04Q 7/20* (2006.01)

(52) U.S. Cl. ............... 455/450; 455/423; 455/436

(58) Field of Classification Search ............... 455/450, 455/423, 436, 517, 451, 13.4, 522; 370/342, 370/441, 335; 375/141  
See application file for complete search history.

(56) References Cited

U.S. PATENT DOCUMENTS

| 2002/0099529 | A1* | 7/2002 | Tang | 703/22 |
| 2002/0172208 | A1* | 11/2002 | Malkamaki | 370/400 |
| 2002/0176362 | A1* | 11/2002 | Yun et al. | 370/236 |
| 2003/0072292 | A1* | 4/2003 | Yoon et al. | 370/342 |
| 2003/0118031 | A1* | 6/2003 | Classon et al. | 379/395.54 |
| 2003/0174669 | A1* | 9/2003 | Roh et al. | 370/328 |
| 2003/0223452 | A1* | 12/2003 | Toskala et al. | 370/442 |
| 2004/0085936 | A1* | 5/2004 | Gopalakrishnan et al. | 370/335 |
| 2004/0097253 | A1* | 5/2004 | Malkamaki | 455/522 |
| 2004/0131106 | A1* | 7/2004 | Kanterakis | 375/141 |
| 2004/0219920 | A1* | 11/2004 | Love et al. | 455/442 |
| 2004/0228313 | A1* | 11/2004 | Cheng et al. | 370/342 |
| 2005/0014508 | A1* | 1/2005 | Moulsley et al. | 455/450 |

FOREIGN PATENT DOCUMENTS

WO WO-02/45274 A2 6/2002

\* cited by examiner

*Primary Examiner*—Joseph Feild  
*Assistant Examiner*—Huy D Nguyen  
(74) *Attorney, Agent, or Firm*—Harrington & Smith, LLP (57) ABSTRACT

A method is described for transmitting data from a mobile station to a wireless network, as is a wireless communications system that operates in accordance with the method. The method includes (a) requesting permission to transmit data using an access channel; (b) in response to receiving a permission message from the wireless network, transmitting the data from the mobile station to the wireless network over a control channel using a modulation and channel coding scheme determined in the wireless network, and communicated to mobile station in the permission message; and (c) in response to receiving the transmitted data at the wireless network, soft combining the received data with previously received data, if any, until a desired decoding result is achieved, and transmitting an acknowledgment of data reception to the mobile station. The steps of transmitting and receiving preferably use a code division, multiple access technique.

40 Claims, 6 Drawing Sheets

METHOD AND APPARATUS PROVIDING ENHANCED RESERVATION ACCESS MODE FOR A CDMA REVERSE CHANNEL

TECHNICAL FIELD

This invention relates generally to wireless communications systems and, more specifically, relates to code division multiple access (CDMA) mobile communication systems that include a reverse link from a mobile station to a base station and, more specifically still, this invention relates to an enhanced reserved access (RA) mode for a reverse enhanced access channel (R-EACH).

BACKGROUND

Figure 1:
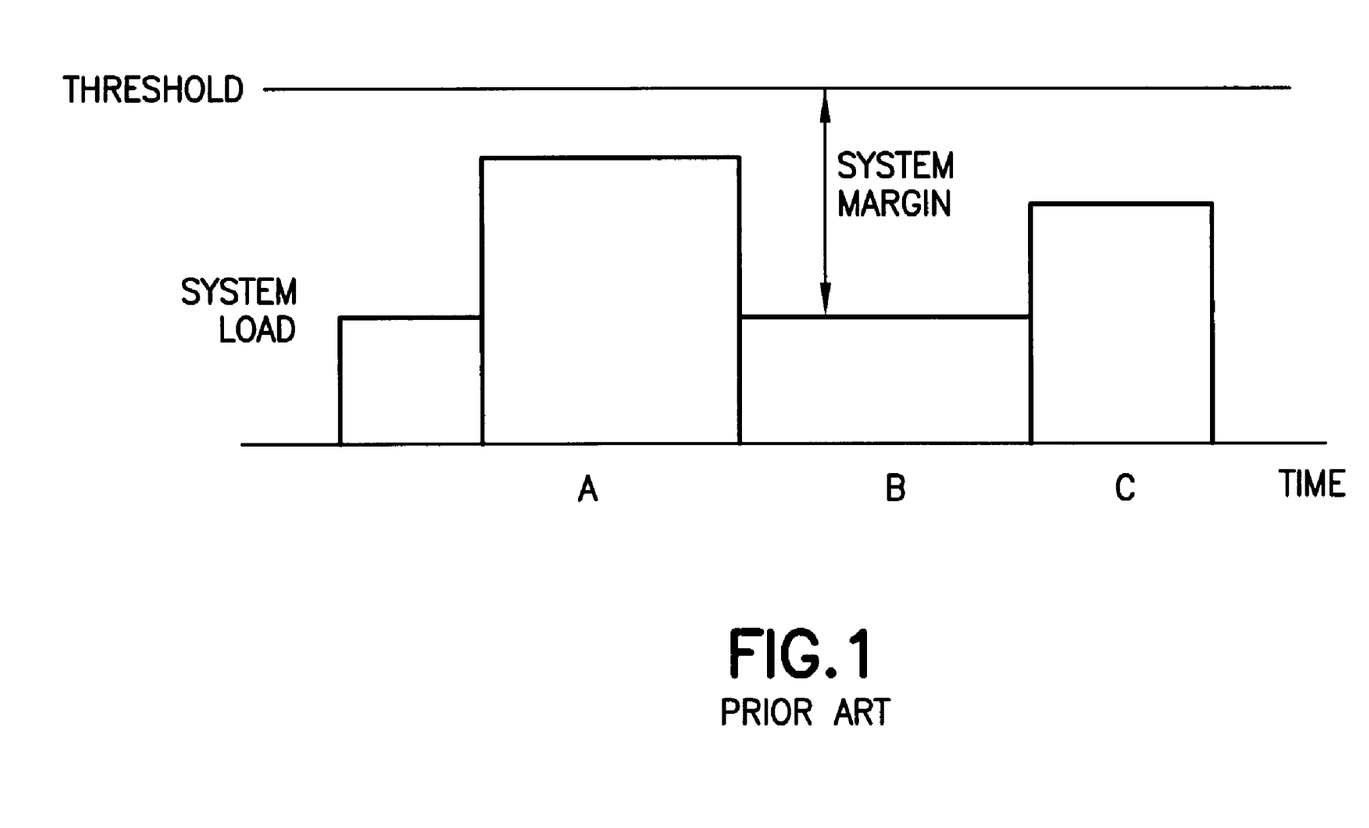
FIG. 1 is a graph showing a conventional example of system load versus time, in relation to a threshold load value.

It is well known in the art that in a CDMA system the uplink (mobile station to base station) is interference limited. Further, the total interference received at the base station should not exceed a certain threshold, otherwise the system will become overloaded. FIG. 1 shows an example of sampled system load variations with time. It is desirable that the system load should always be maintained below the threshold and, to most efficiently make use of the allocated bandwidth, whenever there is system margin available it should be immediately utilized.

As is also well known, it is typically the case that the data traffic between a terminal and the system is asymmetric, i.e., the amount of uplink data traffic is typically much less than the amount of downlink data traffic. For example, a terminal user may be required to input but a few keystrokes in order to download a large text and/or graphics file, such as a web page. As such, the typically low data volume service in the uplink direction requires only a low to medium data rate. Examples of such a low volume data service include HTTP requests and Internet traffic. These and similar services could be readily accommodated by the available system margin shown in FIG. 1.

If a reverse data bearing channel is employed for the uplink data service, a certain amount of time is required to set up and release the channel, as well as for the power control technique to stabilize. However, the low volume of data traffic does not justify the resources and time required for setting up the reverse data bearing channel. Also, if the available system margin is small (e.g., time A in FIG. 1), the access to a data bearing channel may be refused by the wireless network. Moreover, it is possible that by the time the reverse data bearing channel has been set up the system margin may already have been reduced to an unacceptable level (e.g., channel set up is requested at time B, and is completed at time C in FIG. 1).

As such, it can be appreciated that the reverse data bearing channel may not be an optimum resource for use in servicing uplink data traffic.

The R-EACH is conventionally used in the IS-2000 physical layer for various functions, including the frequent transmission of short packets. In the prior art both the basic and reserved access modes can be used for sending short uplink messages. However, their performance is inferior.

SUMMARY OF THE PREFERRED EMBODIMENTS

The foregoing and other problems are overcome, and other advantages are realized, in accordance with the presently preferred embodiments of these teachings.

This invention describes a wireless communication system where an improved reverse enhanced access channel (R-EACH) is employed for servicing uplink data traffic.

This invention provides enhancements to the admission and link control procedures for the R-EACH in order to reduce the access delay, as well as to increase the data throughput for short bursts and/or low volume data traffic.

In accordance with an aspect of this invention, both hybrid automatic request (HARQ) and adaptive modulation and coding (AMC) techniques are employed for implementing a reserved access mode in order to improve error performance, increase the throughput and reduce the delay of sending short messages over the R-EACH.

The procedure begins in the mobile station by sending a series of preambles, with increasing power level, until an acknowledgment (ACK) is received from the base station. Once the mobile station receives an ACK, it begins data frame transmission in the reverse common control channel (R-CCCH) using a modulation and a coding technique that is suitable for the reverse channel conditions. If the base station does not receive the data frame error-free, a no-acknowledge (NACK) signal is sent to the mobile station requesting that the data frame to be re-transmitted. Upon receiving the re-transmitted data frame the base station soft combines it with the earlier received version(s). This approach is referred to as HARQ.

By means of the AMC mechanism, the frame error rate and overall throughput performance can be significantly improved over existing R-EACH procedures, since mobile stations with good channel conditions can transmit higher data rates than other mobile stations. The HARQ process furthermore takes advantage of the channel time diversity, while simultaneously reducing the delay. This is true because the use of the HARQ eliminates the need to re-initialize and re-transmit preambles.

Another aspect of this invention relates to the determination of the modulation and coding scheme (MCS) in AMC. The MCS is preferably selected according to the transmission conditions, as indicated by the quality of received preambles (or by other means), so as to maximize the throughput or to satisfy some performance criteria. A plurality of adaptive learning methods are disclosed for use in determining the MCS, based on measurements obtained during data transmission.

Both the basic access (BA) and reserved access (RA) modes can be used for sending short uplink messages, such as HTTP requests. However, the header available in the RA mode allows more bits to be transmitted to the base station, and is thus preferred. These additional signaling bits can be used to send more information about the preamble (e.g., power level) to facilitate the use of AMC. HARQ used in conjunction with AMC offers a further improvement. The result is an enhanced performance with improved throughput and shorter delays for sending uplink data.

A method is described for transmitting data from a mobile station to a wireless network, as is a wireless communications system that operates in accordance with the method. The method includes (a) requesting permission to transmit data using an access channel; (b) in response to receiving a permission message from the wireless network, transmitting the data from the mobile station to the wireless network over a control channel using a modulation and channel coding scheme determined in the wireless network, and communicated to mobile station in the permission message; and (c) in response to receiving the transmitted data at the wireless network, soft combining the received data with previously received data, if any, until a desired decoding result is achieved, and transmitting an acknowledgment of data reception to the mobile station. The data is preferably transmitted over a power controlled control channel, and the steps of transmitting and receiving preferably use a code division, multiple access technique.

Requesting permission includes transmitting a succession of preambles to the wireless network until the permission message is received, where each preamble is transmitted with a higher power level than a preceding one of the preambles. Each preamble includes an indication of the power level at which the preamble was transmitted, and the method further includes: (i) determining a current channel condition between the mobile station and the wireless network by comparing the indication of the power level at which a received preamble was transmitted with the power level at which the preamble was received; (ii) determining the modulation and channel coding scheme at least partially in accordance with the determined current channel condition; and (iii) communicating the determined modulation and channel coding scheme to the mobile station in the permission message. The modulation and channel coding scheme is preferably further determined in accordance with at least one predetermined performance criterion, such as frame error rate and/or some level of quality of service.

The data can comprise a HTTP request, and may be keystroke-related data entered by a user for interacting with an Internet server.

Computer programs that implement the foregoing features of this invention are also described.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

There are two modes of operation in the R-EACH access: the basic access (BA) mode and the reserved access (RA) mode. This invention prefers the use of the RA mode because of the greater information bearing capability of the RA mode, and the invention will be described in this context. However, the BA mode can be employed as well.

Figure 2:
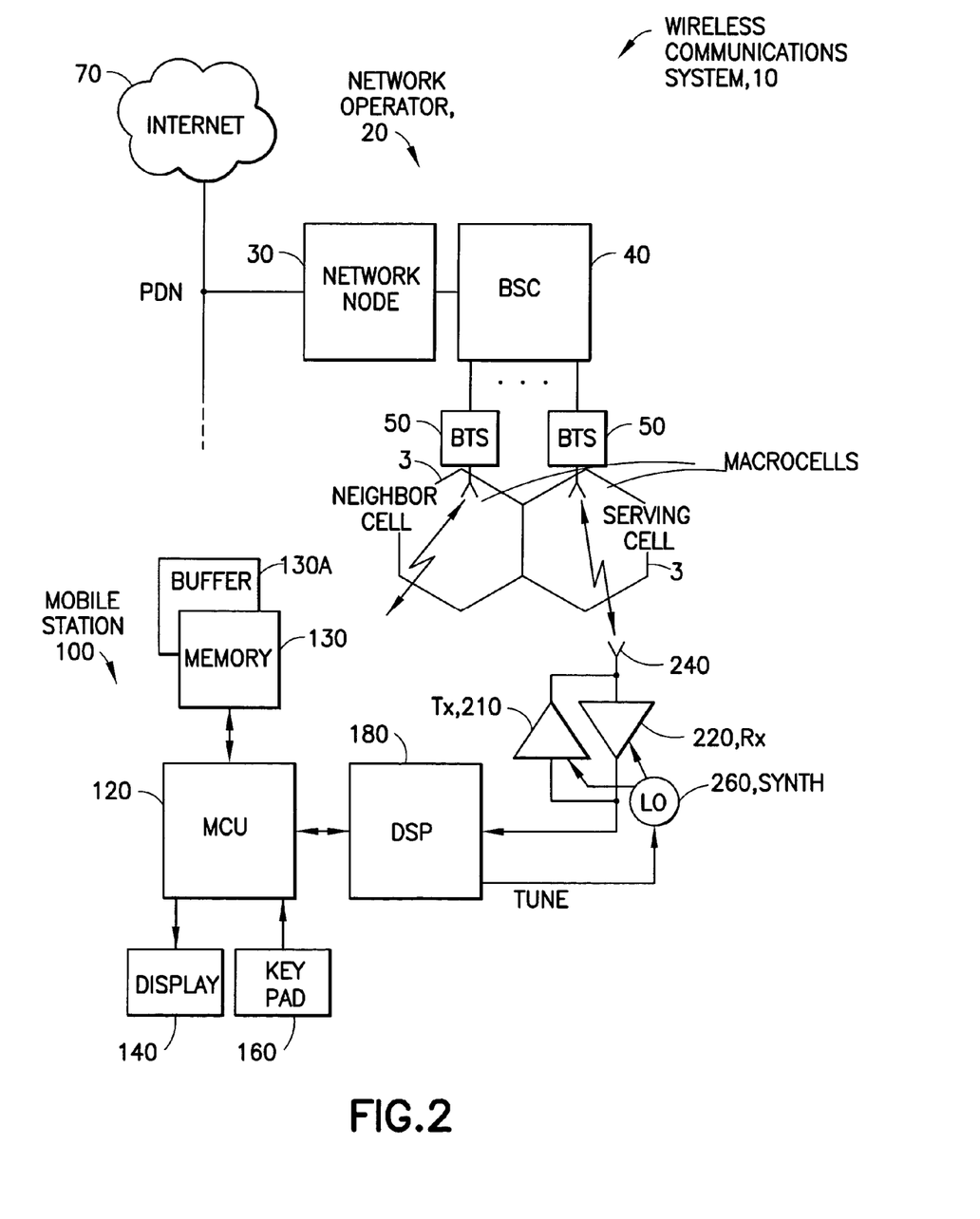
FIG. 2 is a block diagram of a wireless communications system that is suitable for use in practicing this invention.

By way of introduction, and referring to FIG. 2, there is shown as a simplified block diagram an embodiment of a wireless communications system 10 that is suitable for practicing this invention. The wireless communications system 10 includes at least one mobile station (MS) 100. FIG. 2 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., pico-cells) may also be available.

The air interface standard can conform to any suitable standard or protocol, and may enable both voice and data traffic, such as data traffic enabling Internet 70 access and web page downloads. In the presently preferred embodiment of this invention the air interface standard is compatible with a code division multiple access (CDMA) air interface standard, such as one known as cdma2000, although this is not a limitation upon the practice of this invention.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

In accordance with this invention, when the mobile station 100 detects the presence of a short data package in the data buffer 130A, it begins to transmit a series of preambles until a response is received from the base station 50. If no response is received to a given preamble, the mobile station 100 transmits another preamble with a higher power level. The response can be sent over the forward common assignment channel (F-CACH). The mobile station 100 transmits the initial preamble at a power level based on the open loop power control level, and sends the transmitted power level to the base station 50 as part of a header message associated with each preamble. The base station 50, upon proper reception of one of the transmitted preambles, determines the appropriate MCS for the R-EACH transmission based on the current channel condition. The base station 50 estimates the channel condition by knowing the transmitted preamble power level, as indicated by the header, and the received preamble power level. The MCS values are included in the F-CACH message sent by the base station 50, shown as the Reverse Common Control Channel (R-CCCH) assignment in FIG. 3. Once the mobile station 100 receives the R-CCCH assignment, it starts the data transmission on the R-CCCH using the appropriate data rate and modulation format, as specified by the MSC values received from the F-CACH. The R-CCCH transmission is power controlled.

Figure 3:
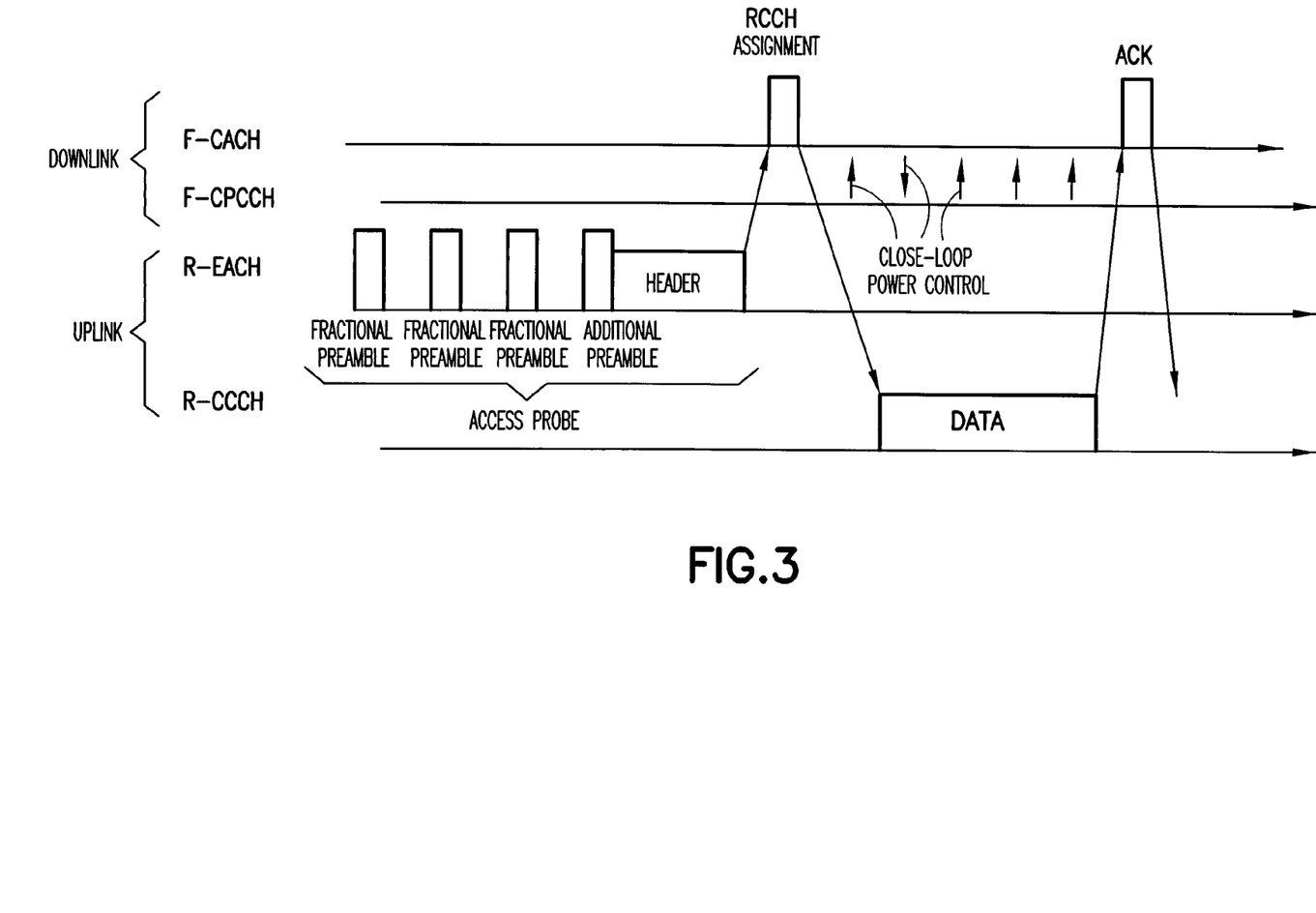
FIG. 3 is a diagram that illustrates the operation of the R-EACH reservation access mode of operation in accordance with this invention.

As is shown in FIG. 3, an access probe transmitted by the mobile station 100 contains a plurality of fractional preambles, an additional preamble and a header. The header contains information such as the requested data rate and a soft handoff request. The reserved R-CCCH channel is used to transmit the data from the mobile station 100 upon receiving permission, via the R-CCCH assignment sent over the F-CACH, from the base station 50. The R-CCCH assignment contains the MCS for use by the mobile station 100 for the data transmission on the R-CCCH. The R-CCCH is closed-loop power controlled via the F-CPCCH. The "permission" sent on the F-CACH is used as an acknowledgment to the mobile station 100 data, where a hash ID is used to identify the mobile station 100. The R-CCCH assignment is sent in, for example, an Early Acknowledgment Channel Assignment Message (EACAM). The EACAM is sent over the CACH channel.

The mobile station 100 uses the most appropriate MCS to encode the data frame according to the transmission conditions measured by the base station 50, and fed back to the mobile station 100 via the F-CACH. Various AMC schemes have been in use for both the forward and reverse links to maximize throughput by adapting to channel conditions. Further performance enhancements may be obtained by choosing the proper MCS to satisfy other criteria, for example, a target frame-error-rate.

The responsibility of choosing a suitable MCS rests with the base station 50, or higher in the network, such as at the BSC 40. Typically, the selection depends on the measured channel quality, for example the uplink signal-to-noise ratio (SNR) as measured from the received access probe preamble power. When the channel is good, a high order modulation scheme, such as 64-QAM, with little or no channel coding is preferred, and conversely when the channel is bad a lower order, more robust modulation scheme, such as QPSK, is desired. For intermediate channel conditions another modulation scheme, such as 16-QAM, may be selected for use by the base station 50. The measured transmission condition maybe divided into a number of fading regions, with each region mapped into a particular MCS. Thus, one basic issue in deploying AMC is to determine the region boundaries or switching thresholds, i.e. when to switch between different MCSs.

In a presently preferred embodiment of this invention an adaptive learning approach is employed for determining region boundaries and/or for determining the adjustment(s) to switching thresholds, i.e. when to switch between different MCSs. Reference can be had to commonly assigned WO 02/45274 A2, "Apparatus, and Associated Method, for Selecting a Switching Threshold for a Transmitter Utilizing Adaptive Modulation Techniques", Clive Tang; which claims priority from U.S. patent application Ser. No. 09/751,640, "Adaptive Learning Method and System to Adaptive Modulation (US 2002/0099529 A1); and U.S. patent application Ser. No. 10/008,094, filed Nov. 13, 2001, "Apparatus, and Associated Method, for Selecting Radio Communication System Parameters Utilizing Learning Controllers", Clive Tang, all of which are incorporated by reference herein in their entireties.

Figure 5A:
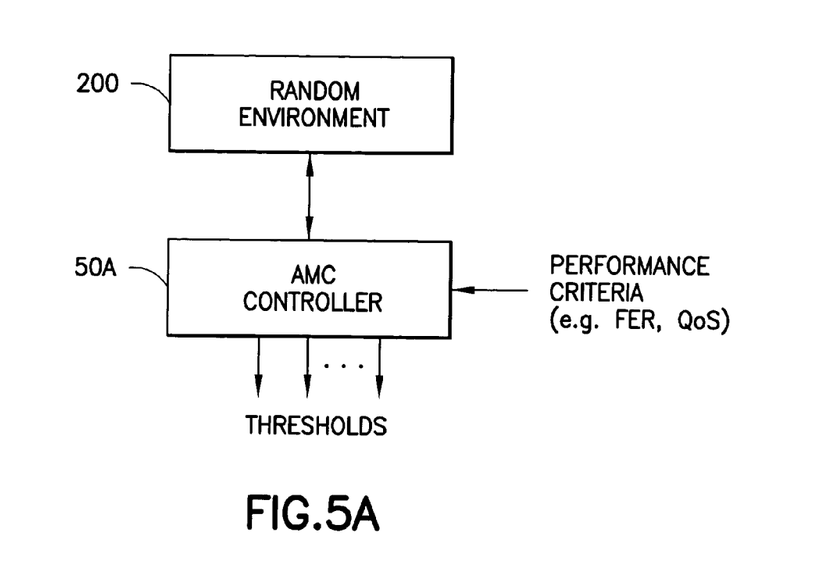
FIGS. 5A and 5B, collectively referred to as FIG. 5, illustrate a wireless network learning automaton employed as an adaptive modulation and coding (AMC) controller.
Figure 5B:
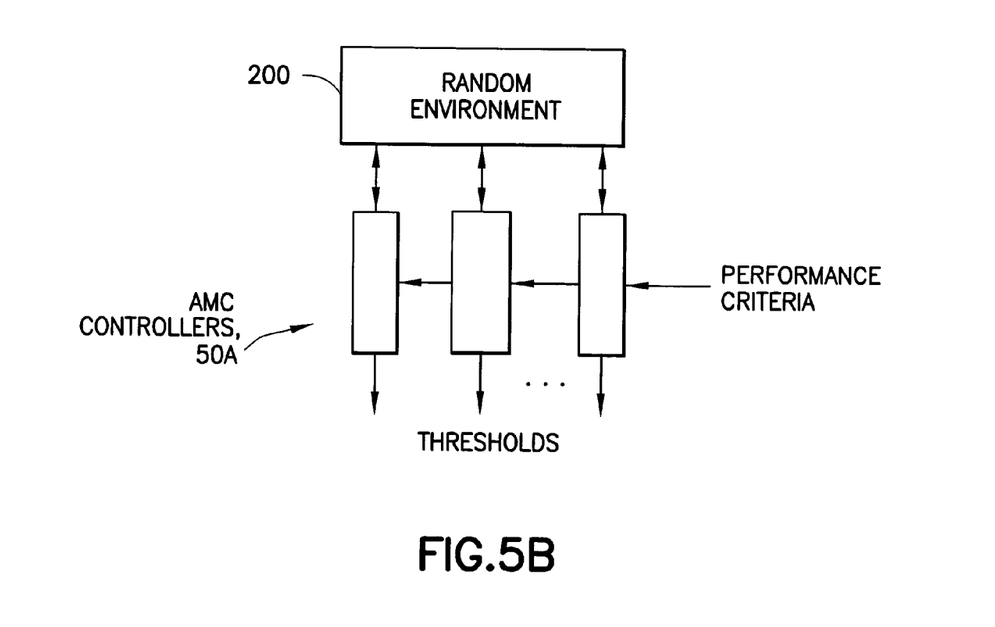

This preferred approach formulates the issue as a data throughput optimization problem, and utilizes intelligent learning and games techniques to obtain an optimal solution. There are several suitable approaches that can be employed, as discussed below. Referring to FIGS. 5A and 5B, a learning automaton, employed as an adaptive modulation and coding (AMC) controller 50A, is assumed to reside in the base station 50, or higher up in the BSC 40, and interacts with the random environment 200, which can be envisioned as comprising a fading channel model.

(a) Adaptive Learning Scheme with Linear Learning Algorithms

In this embodiment, shown in FIG. 5A, a single stochastic learning automaton forms the core of the AMC controller 50A that controls the selection of MCS. The goal is to maximize the data throughput. In this configuration, the automaton output is regarded as a set of switching thresholds. That is, the thresholds are partitioned into a number of combinations, with each combination mapping into a unique automaton output action. The performance of an output action, i.e., a threshold combination, is assessed via an average data throughput that results from selecting that action. The task of the automaton is to choose an action that yields the best data throughput. The transmission of each data frame is regarded as one trial of the automaton. At each trial, the performance of the chosen action is evaluated and the automaton uses a linear learning algorithm to update an internal probability vector that governs the choice of action (i.e., switching thresholds combination) in the next trial. As the channel varies, the switching thresholds are dynamically adjusted so as to maximize the average data throughput.

(b) Adaptive Learning Scheme with Enhanced Learning Algorithms for Constrained Optimization In this embodiment, also shown in FIG. 5A, the single stochastic learning automaton is employed as the AMC controller 50A. The goal of this approach is to maximize the data throughput subject to a performance criterion, for example, subject to a target frame error rate (FER). For many applications a certain Quality of Service (QoS) is often imposed. It is important that the AMC scheme, while trying to switch the MCS to increase the throughput, does so in accordance with the imposed QoS requirement. This scheme adjusts the switching thresholds to optimize the data throughput, and at the same time also insures that other performance criteria are met. The basic configuration is the same as (a) above, however an enhanced learning algorithm that is capable of performing constrained optimization is used to update the automaton's internal probability vector. In this learning algorithm, only those actions that return an acceptable FER during trials are validated to continue in the updating process. This causes the automaton to only select those actions that satisfy the FER constraint in subsequent trials, resulting in convergence to the action that produces the best data throughput, while also meeting the FER (and/or other) constraint(s).

(c) A Decentralized Learning Strategy

This embodiment, shown in FIG. 5B, regards the issue of controlling the AMC 50A as a parameter optimization problem. A performance function is formed and a decentralized learning scheme based on games theory is utilized to search for the best parameter values that optimize the performance function. This approach uses a number of independent controllers, one controller for each parameter, configured in a cooperative game mode. In such a mode the independent controllers are regarded as players of a sequential game with the operating environment 200. At each play of the game each player (controller) chooses an action based on its own strategy and feeds it to the environment. In response to this set of actions, the environment returns to the controllers a common pay-off (outcome) as the performance measure to direct the learning process. The learned information is considered as an experience of the controller to improve the quality of control whenever similar situations occur. By suitably mapping the desired performance function as the outcome, and choosing an appropriate learning controller, it is possible to carry out multiple parameter optimization for the AMC controller 50A.

For the presently preferred application of switching thresholds optimization, a group of cooperating controllers are employed, as in FIG. 5B, with one controller being assigned responsibility for one threshold. Each data frame transmitted is regarded as one play of the game. The achieved average data throughput is used as the common pay-off to the team of controllers 50A. As the data transmission continues, the game is played repeatedly and the switching thresholds dynamically updated by the players (controllers). The common target of all players may be set to solely maximize the data throughput, or to perform constrained optimization if a certain QoS is desired to be met.

Referring again to FIG. 3, after sending the frame of data the mobile station 100 waits to receive an ACK from the base station 50. If an ACK signal is not received (or a NACK signal is received instead), the data frame is re-transmitted. After re-transmitting the data frame the mobile station 100 waits for another ACK or NACK signal, re-transmitting again if necessary. This re-transmission process continues until some predetermined number of re-transmissions are exceeded. The base station 50, upon receiving a re-transmitted data frame, soft combines it with any earlier received data frames before decoding. The soft combining procedure thus weights the encoded data with the associated channel conditions and tends to improve the decoding accuracy. The entire process of acknowledgment, re-transmission and soft combining is commonly known as HARQ Type I in wireless communications systems.

Figure 4A:
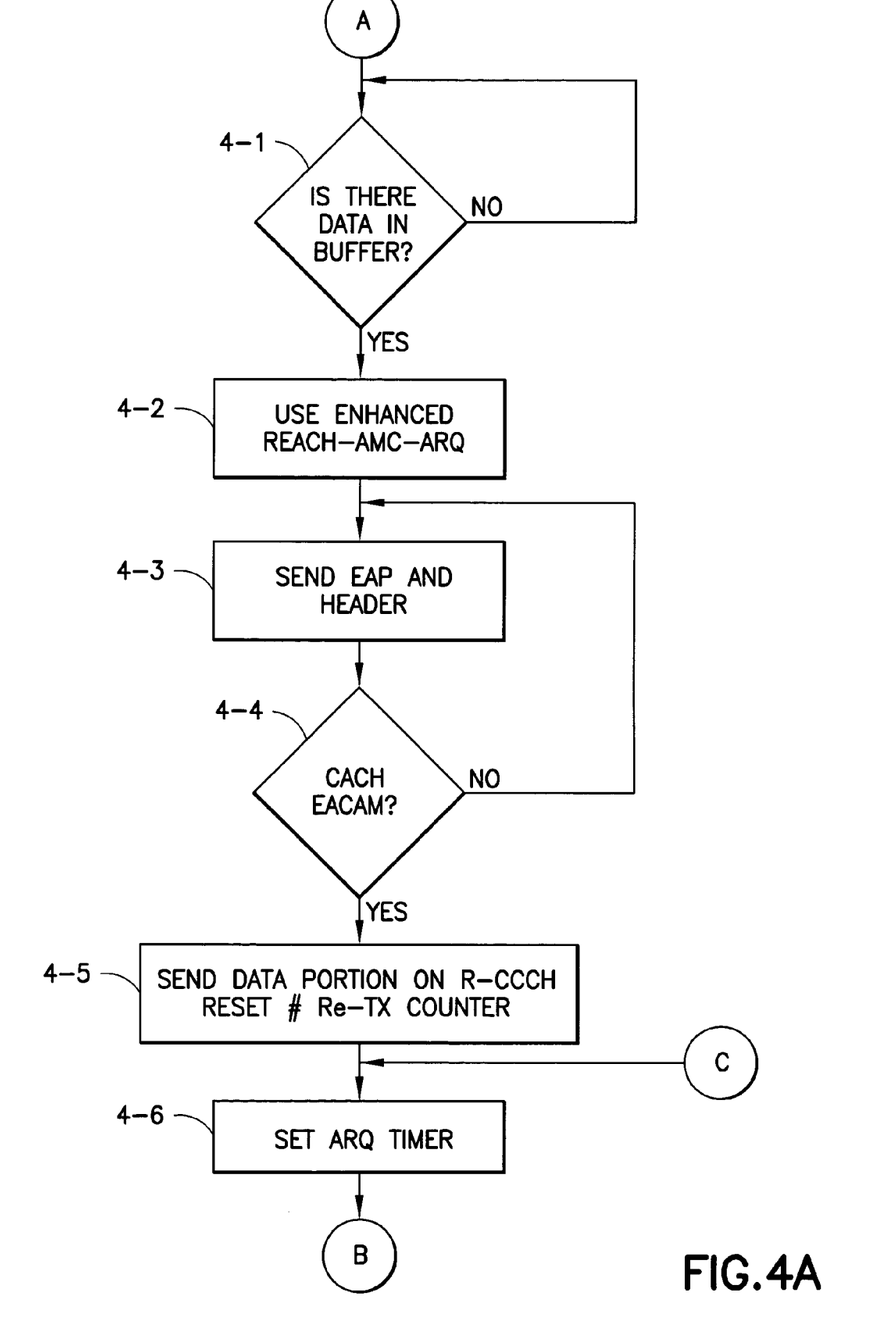
FIGS. 4A and 4B, collectively referred to as FIG. 4, illustrate a method in accordance with this invention.
Figure 4B:
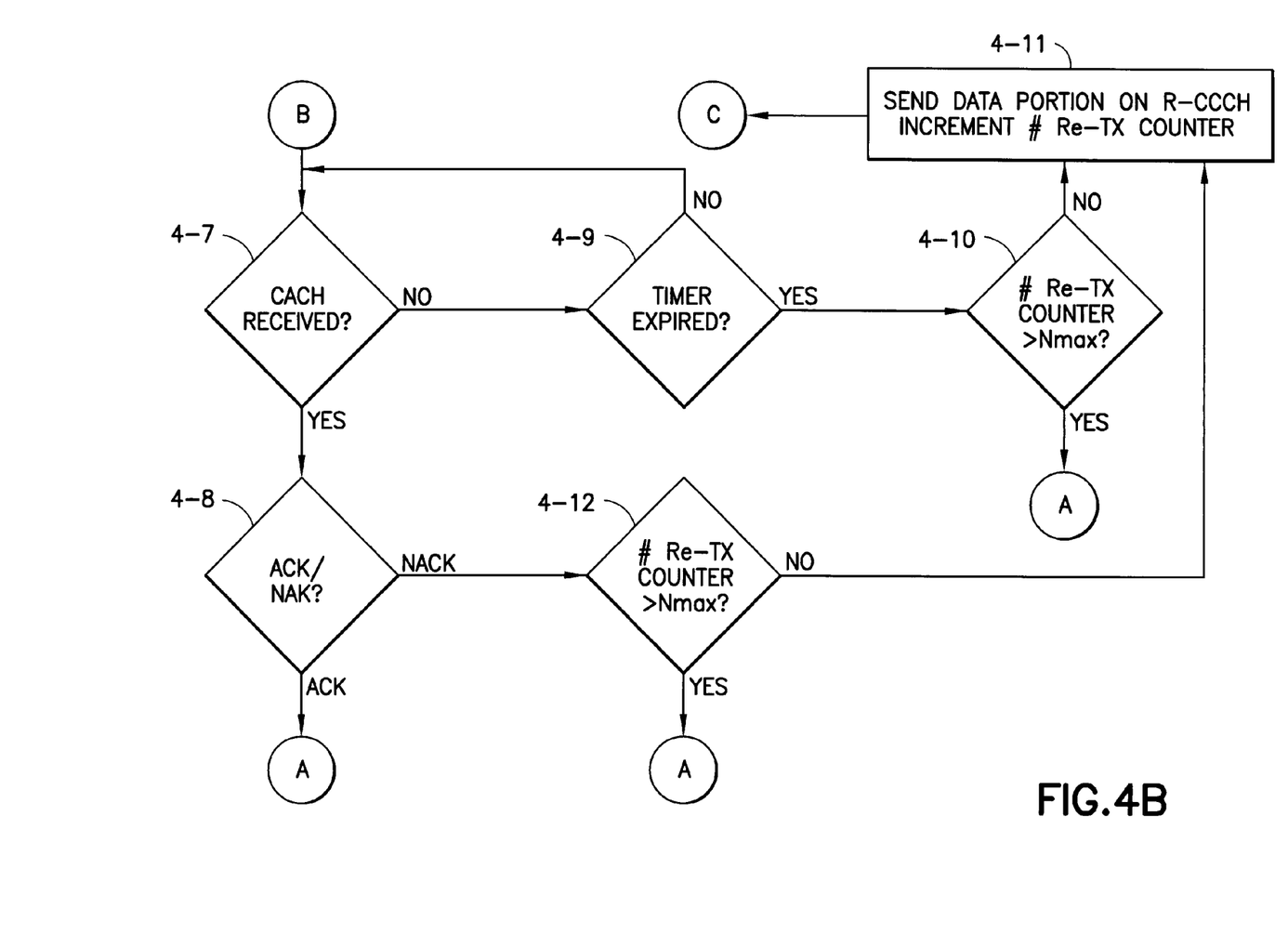

As was noted above, the R-EACH is conventionally used in the IS-2000 physical layer for various functions, including the frequent transmission of short packets. An aspect of this invention is to provide a technique to enhance the total data rate in the R-EACH reverse link transmission by extending the access procedure to include both the AMC and HARQ techniques. The resultant benefit is higher data throughput and shorter delays, since AMC tailors the MCS according to the transmission conditions, and HARQ eliminates the additional time required for re-sending preambles. The soft combining in HARQ further takes advantage of the time diversity offered in a time-varying channel. Reference is now made to FIGS. 4A and 4B for showing a method in accordance with this invention. The steps of initializing and sending data proceed as follows.

The method begins at connector A, and at Step 4-1 the mobile station 100 checks to see if there is data to transmit in the buffer 130A. If there is (e.g., some number of bytes are stored that exceed some threshold number) control passes to Step 4-2 to set-up and use the enhanced REACH-AMC-ARQ technique in accordance with this invention. At Step 4-3 the mobile station transmits the enhanced access preambles and header, as in FIG. 3, and then waits at Step 4-4 for the receipt of the R-CCCH assignment from the CACH/EACAM. If the R-CCCH assignment is not received control loops back to Step 4-3 to send the next preamble with a higher power level. This process continues until the mobile station 100 receives the permission to transmit the data. At Step 4-5 the mobile station 100 transmits the data from the buffer 130A on the R-CCCH, using the appropriate modulation and coding scheme suitable for the channel condition, resets a re-transmission counter to zero, and at Step 4-6 the mobile station 100 sets an ARQ timer. These counters and timers can all be implemented by software using locations in the memory 130. At Step 4-7 the mobile station 100 determines if the CACH was received and, if it was, a check is made at Step 4-8 whether an ACK or a NACK was signaled by the base station 50. Assuming that an ACK was received, the data in the buffer 130A was successfully sent to the base station 50, and the method returns to the connector A to wait until new data is found in the buffer 130A.

If at Step 4-7 the CACH is not found to have been received, control passes instead to Step 4-9 to check the ARQ timer, and the loop of Steps 4-7 and 4-9 is repeated until either the CACH is received or the ARQ timer expires. If the ARQ timer expires control passes to Step 4-10 to determine if the re-transmission counter has reached some threshold value (>Nmax). If it has, the method terminates and control passes back to connector A to re-start the transmission process (it is assumed that the data is still contained in the buffer 130A). If the re-transmission counter has not reached the threshold value, control passes to Step 4-11 to re-transmit the data on the R-CCCH, and to increment the re-transmission counter. Control then passes to connector C, the ARQ timer is set at Step 4-6, and the method continues at Step 4-7 as described above.

If a NACK is received at Step 4-8, then control passes to Step 4-12 to determine if the re-transmission counter has reached the threshold value. If it has, the method terminates and control passes back to connector A to re-start the transmission process. If the re-transmission counter has not reached the threshold value, control passes to Step 4-11 to re-transmit the data on the R-CCCH, and to increment the re-transmission counter. Control then passes to connector C, the ARQ timer is set at Step 4-6, and the method continues at Step 4-7 as described above.

It should be noted in the description of FIG. 4 that the base station 50 maintains the same reservation assignments for the R-CCCH.

It should further be noted that this invention pertains as well to one or more computer programs executed by one or more data processors found in the mobile station 100 (e.g., the MCU 120 and/or the DSP 180), as well as one or more data processors found in the wireless network 20, such as in the base stations 50 and/or the BSC 40.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other modulation and coding formats, other types of learning automata or learning schemes, other types of air interface standards (e.g., TDMA-type air interfaces), and other mobile station and wireless network architectures may be attempted by those skilled in the art. However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method for transmitting data from a mobile station to a wireless network, comprising:
   requesting permission to transmit data using an access channel;
   in response to receiving the permission message from the wireless network, transmitting the data from the mobile station to the wireless network over a control channel using a modulation and channel coding scheme determined in the wireless network, and communicated to the mobile station in the permission message;
   in response to receiving the transmitted data at the wireless network, soft combining the received data with previously received data, if any, until a desired decoding result is achieved, and transmitting an acknowledgment of data reception to the mobile station, where requesting permission comprises transmitting a succession of preambles to the wireless network until the permission message is received, where each preamble is transmitted with a higher power level than a preceding one of the preambles, where each preamble includes an indication of the power level at which the preamble was transmitted;
   determining a current channel condition between the mobile station and the wireless network by comparing the indication of the power level at which a received preamble was transmitted with the power level at which the preamble was received;
   determining the modulation and channel coding scheme at least partially in accordance with the determined current channel condition; and
   communicating the determined modulation and channel coding scheme to the mobile station in the permission message.

2. A method as in claim 1, where the data is transmitted over a power controlled control channel.

3. A method as in claim 1, where transmitting and receiving occur using a code division, multiple access technique.

4. A method as in claim 1, where the modulation and channel coding scheme is further determined in accordance with at least one predetermined performance criterion.

5. A method as in claim 1, where the data comprises a HTTP request.

6. A method as in claim 1, where the data comprises keystroke-related data entered by a user for interacting with an Internet server.

7. A wireless communications system comprising a wireless network and at least one mobile station each comprising a radio frequency (RF) transceiver for being bidirectionally coupled together through a radio channel, comprising a mobile station controller, responsive to a presence of data in a data buffer, for requesting permission to transmit data using an access channel, said mobile station controller, in response to receiving a permission message from the wireless network, transmitting the data to the wireless network over a control channel using a modulation and channel coding scheme determined in the wireless network, and communicated to mobile station in the permission message; and a wireless network controller, responsive to receiving the transmitted data at the wireless network, for soft combining the received data with previously received data, if any, until a desired decoding result is achieved, and for transmitting an acknowledgment of data reception to the mobile station, where when requesting permission the mobile station controller transmits a succession of preambles to the wireless network until the permission message is received, where each preamble is transmitted with a higher power level than a preceding one of the preambles, where each preamble includes an indication of the power level at which the preamble was transmitted, and where the wireless network controller determines a current channel condition between the mobile station and the wireless network by comparing the indication of the power level at which a received preamble was transmitted with the power level at which the preamble was received, and determines the modulation and channel coding scheme at least partially in accordance with the determined current channel condition, said wireless network controller transmitting the determined modulation and channel coding scheme to the mobile station with the permission message.

8. A wireless communications system as in claim 7, where the data is transmitted over a power controlled control channel.

9. A wireless communications system as in claim 7, where transmitting and receiving occur using a code division, multiple access technique.

10. A wireless communications system as in claim 7, where the modulation and channel coding scheme is further determined by the wireless network controller in accordance with at least one predetermined performance criterion.

11. A wireless communications system as in claim 7, where the data comprises a HTTP request.

12. A wireless communications system as in claim 7, where the data comprises keystroke-related data entered by a user of the mobile station for interacting with an Internet server.

13. A network component of a wireless communications system comprising a radio frequency (RF) transceiver for being bidirectionally to at least one mobile station through a radio channel, further comprising a controller, responsive to receiving a request over an access channel from the at least one mobile station to transmit data, for determining a modulation and channel coding scheme and transmitting a permission message to the mobile station that includes an indication of the determined modulation and channel coding scheme, said controller operating to subsequently receive the data from a control channel and to soft combine the received data with previously received data, if any, until a desired decoding result is achieved, and to transmit an acknowledgment of data reception to the mobile station, where said request is received as a succession of preambles and each preamble is transmitted with a higher power level than a preceding one of the preambles, where said request comprises an indication of a power level at which the request was transmitted, and where said controller determines a current channel condition between the mobile station and the wireless network by comparing the indication of a power level at which said request was transmitted with a power level at which said request was received, and determines the modulation and channel coding scheme at least partially in accordance with the determined current channel condition.

14. A network component as in claim 13, where said request is received over a reverse enhanced access channel (R-EACH), and where said data is received over a reverse common control channel (R-CCCH).

15. A network component as in claim 13, where said controller resides in a base station.

16. A network component as in claim 13, where said controller resides in a base station controller.

17. A network component as in claim 13, where said controller operates, when determining said modulation and channel coding scheme, in accordance with an adaptive learning controller that employs an intelligent learning and games technique so as to optimize data throughput for said at least one mobile station.

18. A network component as in claim 17, where said intelligent learning and games technique comprises an adaptive learning scheme with linear learning algorithms.

19. A network component as in claim 17, where said intelligent learning and games technique comprises a learning algorithm for constrained optimization that is used to update an internal probability vector.

20. A network component as in claim 17, where said intelligent learning and games technique comprises a decentralized learning strategy.

21. A network component as in claim 13, where said radio channel conveys code division multiple access (CDMA) transmissions to and from said at least one mobile station.

22. A computer program stored in a computer readable medium for controlling operation of a plurality of data processors distributed between a mobile station and a wireless network, said computer program comprising code segments, said code segments comprising:

a mobile station code segment comprising computer code for causing said mobile station to request permission to transmit data using an access channel and, responsive to receiving a permission message from the wireless network, to cause said mobile station to transmit the data to the wireless network over a control channel using a modulation and channel coding scheme determined in the wireless network, and communicated to the mobile station in the permission message; and a wireless network code segment comprising computer code for causing said wireless network to be responsive to receiving the transmitted data for soft combining the received data with previously received data, if any, until a desired decoding result is achieved, and for transmitting an acknowledgment of data reception to the mobile station, where said mobile station code segment further comprises computer code for causing said mobile station to transmit a succession of preambles to the wireless network until the permission message is received, where each preamble is transmitted with a higher power level than a preceding one of the preambles, where each preamble includes an indication of the power level at which the preamble was transmitted, where said wireless network code segment further comprises computer code for causing said wireless network to determine a current channel condition between the mobile station and the wireless network by comparing the indication of the power level at which a received preamble was transmitted with the power level at which the preamble was received; to determine the modulation and channel coding scheme at least partially in accordance with the determined current channel condition; and to communicate the determined modulation and channel coding scheme to the mobile station in the permission message.

23. A computer program as in claim 22, where the data is transmitted over a power controlled control channel.

24. A computer program as in claim 22, where transmitting and receiving occur using a code division, multiple access technique.

25. A computer program as in claim 22, where said wireless network code segment computer code causes the modulation and channel coding scheme to be further determined in accordance with at least one predetermined performance criterion.

26. A computer program as in claim 22, where said a mobile station code segment further comprises computer code for transmitting the data that comprises at least one of a HTTP request and keystroke-related data entered by a user for interacting with an Internet server.

27. A computer program stored in a computer readable medium for controlling operation of at least one data processor that comprises part of a wireless communications system, the system comprising a radio frequency (RF) transceiver for being bidirectionally coupled to at least one mobile station through a radio channel, said computer program controlling operating of a data processor so as to be responsive to receiving a request over an access channel from the at least one mobile station to transmit data, for determining a modulation and channel coding scheme and for transmitting a permission message to the mobile station that includes an indication of the determined modulation and channel coding scheme, said data processor further operating under control of said computer program to receive the data from a control channel and to soft combine the received data with previously received data, if any, until a desired decoding result is achieved, and to transmit an acknowledgment of data reception to the mobile station, where said request comprises an indication of the power level at which the request was transmitted, and where said computer program control said data processor to determine a current channel condition between the mobile station and the wireless network by comparing the indication of the power level at which said request was transmitted with the power level at which said request was received, and to determine the modulation and channel coding scheme at least partially in accordance with the determined current channel condition.

28. A computer program as in claim 27, where said request is received as a succession of preambles each preamble transmitted with a higher power level than a preceding one of the preambles.

29. A computer program as in claim 27, where said request is received over a reverse enhanced access channel (R-EACH), and where said data is received over a reverse common control channel (R-CCCH).

30. A computer program as in claim 27, where said computer program controls said data processor or another data processor, when determining said modulation and channel coding scheme, to implement an adaptive learning controller that employs an intelligent learning and games technique so as to optimize data throughput for said at least one mobile station.

31. A computer program as in claim 30, where said intelligent learning and games technique comprises an adaptive learning scheme with linear learning algorithms.

32. A computer program as in claim 30, where said intelligent learning and games technique comprises a learning algorithm for constrained optimization that is used to update an internal probability vector.

33. A computer program as in claim 30, where said intelligent learning and games technique comprises a decentralized learning strategy.

34. A computer program stored in a computer readable medium for controlling operation of at least one data processor comprising part of a mobile station to perform operations of:
  requesting permission to transmit data using an access channel; and
  responsive to receiving a permission message from a wireless network, transmitting the data to the wireless network over a control channel using a modulation and channel coding scheme determined in the wireless network, and communicated to the mobile station so as to comprise at least a part of the permission message, wherein the modulation and channel coding scheme is determined in the wireless network at least partially in accordance with a determined current channel condition between the mobile station and the wireless network by comparing the indication of a power level at which the request was transmitted with a power level at which the request was received, and communicated to the mobile station so as to comprise at least a part of the permission message.

35. A mobile station comprising a transceiver operable in a wireless network, comprising means for requesting permission to transmit data using an access channel and means, responsive to receiving a permission message from the wireless network, for transmitting the data to the wireless network over a control channel using a modulation and channel coding scheme determined in the wireless network, and communicated to the mobile station so as to comprise at least a part of the permission message, wherein the modulation and channel coding scheme is determined in the wireless network at least partially in accordance with a current channel condition as determined by a comparison of a power level associated with at least one transmitted preamble corresponding to requesting permission, and communicated to the mobile station so as to comprise at least a part of the permission message.

36. A component comprising a transceiver operable in a wireless network, comprising means, responsive to receiving a request to transmit data over an access channel from at least one mobile station, for determining a modulation and channel coding scheme, means for transmitting a permission message to the mobile station that comprises an indication of the determined modulation and channel coding scheme, and means for receiving the data from a control channel and for soft combining the received data with previously received data, if any, until a desired decoding result is achieved, wherein the modulation and channel coding scheme is determined by a current channel condition and the current channel condition is determined at least partially by a comparison of a power level of a preamble transmitted in requesting permission with a power level at which the preamble is received.

37. A method for transmitting data from a mobile station to a wireless network, comprising:
  requesting permission to transmit data using an access channel;
  in response to receiving the permission message from the wireless network, transmitting the data from the mobile station to the wireless network over a control channel using a modulation and channel coding scheme determined in the wireless network, wherein the determined modulation and channel coding scheme is communicated to the mobile station in the permission message, wherein the modulation and channel coding scheme is determined in the wireless network at least partially in accordance with a determined current channel condition between the mobile station and the wireless network by comparing the indication of a power level at which the request was transmitted with a power level at which the request was received, and communicated to the mobile station so as to comprise at least a part of the permission message.

38. A method as in claim 37, further comprising in response to receiving the transmitted data at the wireless network, soft combining the received data with previously received data, if any, until a desired decoding result is achieved.

39. A method as in claim 37, further comprising in response to receiving the transmitted data at the wireless network, transmitting an acknowledgment of data reception to the mobile station.

40. A method as in claim 37, wherein requesting permission includes a soft handoff request.

* * * * *